United States Patent
Trocki

(10) Patent No.: US 11,321,159 B2
(45) Date of Patent: May 3, 2022

(54) INTERCHANGEABLE PLUGINS FOR DETECTING CONFLICTS BETWEEN SERVER-SIDE DATA AND CLIENT-SIDE DATA

(71) Applicant: Red Hat, Inc., Raleigh, NC (US)

(72) Inventor: Wojciech Julian Trocki, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 154 days.

(21) Appl. No.: 16/503,183

(22) Filed: Jul. 3, 2019

(65) Prior Publication Data

US 2021/0004283 A1    Jan. 7, 2021

(51) Int. Cl.
| | |
|---|---|
| *G06F 11/07* | (2006.01) |
| *H04L 29/06* | (2006.01) |
| *G06F 9/54* | (2006.01) |
| *G06F 9/445* | (2018.01) |
| *H04L 67/01* | (2022.01) |

(52) U.S. Cl.
CPC ........ *G06F 11/079* (2013.01); *G06F 9/44526* (2013.01); *G06F 9/541* (2013.01); *H04L 67/42* (2013.01)

(58) Field of Classification Search
None
See application file for complete search history.

(56) References Cited

U.S. PATENT DOCUMENTS 6,393,434 B1 * 5/2002 Huang .................... G06F 16/27
7,509,638 B2 * 3/2009 Backhouse ............... G06F 8/60
   717/176
7,512,638 B2   3/2009 Jhaveri et al.
(Continued)

FOREIGN PATENT DOCUMENTS

CN    109587212 A    4/2019

OTHER PUBLICATIONS

"Developing a Data Sync App," Red Hat, Inc., 2019, https://access.redhat.com/documentation/en-us/red_heat_mobile_developer_services/1/html-single/developing_a_data_sync_app/index.
(Continued)

*Primary Examiner* — Umut Onat
(74) *Attorney, Agent, or Firm* — Kilpatrick Townsend & Stockton LLP

(57) ABSTRACT

Conflicts can be detected between server-side data and client-side data using interchangeable plugins. In one example, a system can receive an interchangeable plugin from among a group of interchangeable plugins for performing conflict detection between server-side data handled by a server and client-side data handled by a client device. Each interchangeable plugin can implement a particular conflict-detection strategy that is different than the other interchangeable plugins and can be selectively integratable into an application programming interface (API) through which the client device is to communicate with the server. The system can integrate the interchangeable plugin into the API to enable the API to implement the particular conflict-detection strategy defined by the interchangeable plugin. The system can then detect a conflict between the server-side data and the client-side data in accordance with the particular conflict-detection strategy defined by the interchangeable plugin.

20 Claims, 4 Drawing Sheets

---

402
Receive an interchangeable plugin from among a plurality of interchangeable plugins for performing conflict detection between server-side data handled by a server and client-side data handled by a client device, each interchangeable plugin being configured for implementing a particular conflict-detection strategy that is different than the other interchangeable plugins and being selectively integratable into an application programming interface (API) through which the client device is to communicate with the server

↓

404
Integrate the interchangeable plugin into the API to enable the API to implement the particular conflict-detection strategy defined by the interchangeable plugin

↓

406
Detect a conflict between the server-side data and the client-side data in accordance with the particular conflict-detection strategy defined by the interchangeable plugin

(56) References Cited

U.S. PATENT DOCUMENTS

| | | | | |
|---|---|---|---|---|
| 7,559,034 | B1* | 7/2009 | Paperny | G06F 9/44526 |
| | | | | 345/629 |
| 7,840,633 | B2* | 11/2010 | DeFrang | G06F 9/548 |
| | | | | 709/202 |
| 8,161,107 | B2* | 4/2012 | Gregg | H04L 51/00 |
| | | | | 709/204 |
| 8,776,166 | B1* | 7/2014 | Erickson | H04L 12/4633 |
| | | | | 726/1 |
| 9,201,669 | B2* | 12/2015 | Schneider | G06F 9/44526 |
| 9,336,228 | B2* | 5/2016 | Murali-Venkataraman | |
| | | | | G06F 16/178 |
| 9,710,673 | B2 | 7/2017 | Brouwer et al. | |
| 10,740,297 | B2* | 8/2020 | Knotts | G06F 40/166 |
| 2007/0088707 | A1* | 4/2007 | Durgin | G06F 16/275 |
| 2007/0277115 | A1* | 11/2007 | Glinsky | G01V 1/34 |
| | | | | 715/771 |
| 2010/0281487 | A1* | 11/2010 | Schneider | G06F 9/44526 |
| | | | | 718/104 |
| 2017/0161313 | A1 | 6/2017 | Ritter | |

OTHER PUBLICATIONS

Kalapos, G., "Database Synchronization Between Mobile Devices and Classical Relational Database Management Systems," Faculty of Engineering and Natural Sciences, Jan. 2015, https://kalapos.net/Media/Default/pds/Db_sync_between_mobile_devices_and_classical_dbmss_Gergely_Kalapos_Public.pdf.

McCormack, D., "Data Synchronization," objc.io, Mar. 2014, https://www.objc.io/issues/10-syncing-data/data-synchronization/#conflict-resolution.

* cited by examiner

US 11,321,159 B2

INTERCHANGEABLE PLUGINS FOR DETECTING CONFLICTS BETWEEN SERVER-SIDE DATA AND CLIENT-SIDE DATA

TECHNICAL FIELD

The present disclosure relates generally to resolving data conflicts between clients and servers. More specifically, but not by way of limitation, this disclosure relates to interchangeable plugins for detecting conflicts between server-side data and client-side data.

BACKGROUND

In a typical client-server architecture, a server provides services to one or more client devices. This often involves sharing data between the server and the client devices. The data stored at the server side can be referred to as server-side data, and the data stored at the client side can be referred to as client-side data. It is typically desirable for the server-side data to match the client-side data so that the two are in synch. But for a variety of reasons, differences can arise between the server-side data and the client-side data, resulting in a conflict between the two. For example, a client device may lose Internet access for a period of time. While the client devices is offline, another client device may submit a request to the server that causes the server-side data to change, resulting in the offline client device having outdated data. Alternatively, the server's data may become outdated if the offline client device changes its version of the data (e.g., as a result of executing an application or user input). Either way, the result is a conflict between the server-side data and the client-side data that can lead to a variety of problems. To avoid such problems, system administrators typically employ conflict-handling mechanisms that resolve these types of conflicts.

DETAILED DESCRIPTION

Figure 1:
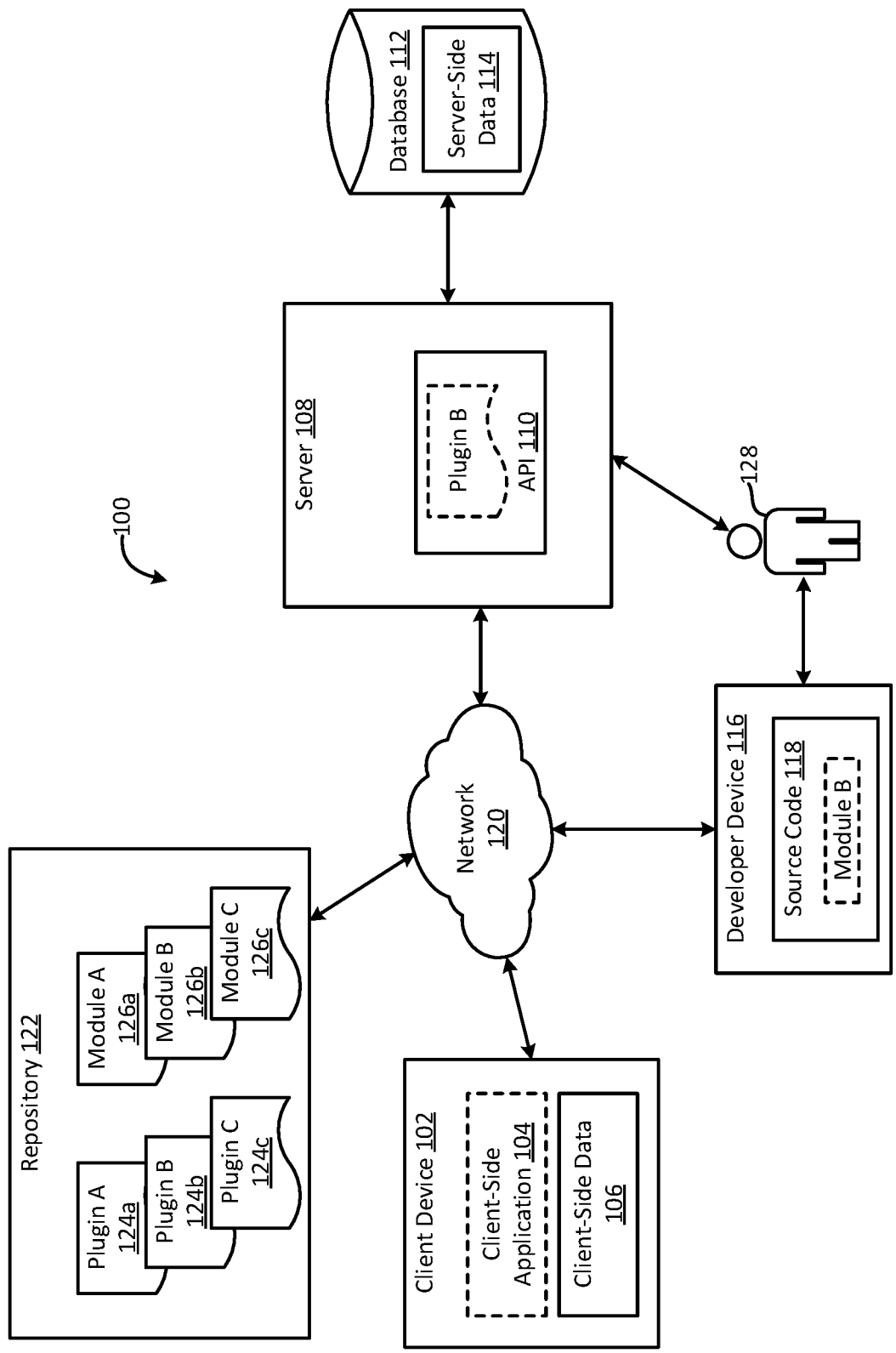
FIG. 1 is a block diagram of an example of a system including interchangeable plugins for detecting conflicts between server-side data and client-side data according to some aspects.

Client-server systems typically employ conflict-detection processes to detect conflicts between server-side data handled by servers and client-side data handled by client devices, so that these conflicts can be resolved. But these conflict-detection processes are typically highly customized and dependent on the particular characteristics of the client-server systems. For example, the specific conflict-detection process that is employed may depend on the type of database in which the data is stored on the server side, the configuration of the fields in the database, how the server processes and stores the data in the database, and other factors. As a result, system administrators often need to create custom programs that implement custom conflict-detection processes suitable to their particular client-server system, which is time consuming, expensive, and error prone. Further, client-side applications designed to interface with these servers must also be customized to adhere to the specific conflict-detection process employed by the client-server system. This tethers the client-side applications to that particular client-server system, which may be problematic if newer or better alternatives become available. For example, a client-server system may rely on a particular type of database and employ a particular conflict-detection process associated with that database. So, a developer of a client-side application may have to expend significant time and resources to customize the client-side application to adhere to the conflict-detection process associated with that particular type of database. If a better option subsequently becomes available (e.g., a database that is cheaper, faster, or less error-prone), it may be too costly to update the application to making switching databases feasible. This inflexibility impedes progress and results in costly, outdated, and suboptimal applications.

Some examples of the present disclosure overcome one or more of the abovementioned problems via a set of preprogrammed, interchangeable plugins that employ a variety of different conflict-detection strategies. Each of the conflict-detection strategies can specify where a conflict is to be detected (e.g., at the client side or the server side), how a conflict is to be detected (e.g., by comparing version fields in a database or by comparing hashed versions of the data), how the conflict is to be resolved (e.g., by prioritizing the server-side data over the client-side data, or vice-versa), or any combination of these. A user can select whichever of the interchangeable plugins has the conflict-detection strategy that is most suitable for its client-server system and easily integrate the plugin into the client-server system to facilitate conflict detection and resolution. Additionally, each of the interchangeable plugins can have a corresponding application module configured to be easily integrated into a client-side application. The application module is a preprogrammed code library that can be incorporated into the source code of the client-side application (e.g., during development of the client-side application). The application module can enable the client-side application to cooperate with the server to implement the particular conflict-detection strategy selected by the user. The interchangeable plugins and/or corresponding application modules can provide for a faster, cheaper, more flexible, and less error-prone process for implementing conflict detection than traditional approaches.

As one particular example, a developer may be creating a mobile application that can interact with a server via an application programming interface (API). The server can implement backend functionality for the mobile application. Part of the interaction between the mobile application and the server may involve resolving conflicts between client-side data handled by the mobile application and server-side data handled by the server. To effectuate this type of conflict resolution, the developer can access a list of preprogrammed, interchangeable plugins that implement different conflict-detection strategies. In some examples, at least one of the interchangeable plugins may be written using the GraphQL data query and manipulation language. The developer can obtain (e.g., download) the best interchangeable plugin for the database architecture of the client-server system and easily incorporate that interchangeable plugin into the API, for example, by importing the plugin into API software. Additionally or alternatively, the developer can obtain a preprogrammed application module corresponding to the interchangeable plugin and integrate the application module into the mobile application. For example, the developer can incorporate the application module into the source code for the mobile application and then compile the source code to produce an executable version of the mobile application. After integrating the interchangeable plugin into the API and/or the application module into the mobile application, the server and the mobile application may be capable of cooperating with one another to implement the conflict-detection strategy selected by the developer.

In some examples, the interchangeable plugins and the application modules are designed to work "out of the box," such that they require little or no customization by the user. For example, each of the interchangeable plugins may be specifically tailored for a particular database architecture, so that a user need only select the right one for his system. And in some examples, the interchangeable plugins are further customizable using functions and objects that are abstracted from the underlying specifics (e.g., database architectures) of the client-server system, so that the interchangeable plugins and application modules can be easily used by less sophisticated users.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 including interchangeable plugins 124a-c for detecting conflicts between server-side data 114 and client-side data 106 according to some aspects. The system 100 includes a developer device 116, a server 108, a repository 122, and client devices 102 communicatively coupled to one another via a network 120. The network 120 can include a local area network (LAN) or a wide area network (WAN), such as the Internet.

The developer device 116 is a client device used by a software developer 128 to create an application, such as a client-side application. A client-side application is a software application configured to be executed by one or more client devices 102, which may be mobile devices (e.g., smartphones, tablets, or e-readers) in some examples. The developer device 116 may include any suitable software components for creating client-side applications, such as software development kits (SDKs), compilers, interpreters, libraries, etc. In this example, the developer device 116 includes at least the source code 118 for a client-side application 104.

The software developer 128 may want the client-side application 104 to interact with a server 108 (e.g., a backend server), which can perform various functionality supporting operation of the client-side application 104. So, the software developer 128 may employ an application programming interface (API) 110 on the server 108 through which the client-side application 104 can communicate with the server 108. For example, the software developer 128 may employ a RESTful API on the server 108 through which the client device 102 can communicate with the server 108 by issuing REST (Representational State Transfer) commands.

The server 108 can be communicatively coupled to a database 112 for storing server-side data 114 to support operation of the client-side application 104. For example, the server 108 can respond to read requests received from the client devices 102 via the API 110 by obtaining the appropriate server-side data 114 from the database 112 and transmitting it to the client devices 102. Alternatively, the server 108 can respond to write requests received from the client devices 102 via the API 110 by storing the appropriate information from the client devices 102 as server-side data 114 in the database 112.

In some examples, the software developer 129 may also want interactions between the client-side application 104 and the server 108 to include resolving conflicts between the client-side data 106 handled the client device(s) 102 and the server-side data 114 handled by the server 108. So, the software developer 128 can access a list of preprogrammed, interchangeable plugins 124a-c that implement different conflict-detection strategies. For example, the software developer 128 can access a repository 122 having any number and combination of interchangeable plugins 124a-c written in any number and combination of programming languages, with each of the interchangeable plugins 124a-c being configured for implementing a conflict-detection strategy that is different from the other interchangeable plugins 124a-c. The repository 122 may have dozens or hundreds of open-source interchangeable plugins created by numerous entities, along with descriptions of each of the interchangeable plugins.

Each of the interchangeable plugins 124a-c may specify how to detect a conflict between the server-side data 114 and the client-side data 106. For example, an interchangeable plugin 124a may specify that a conflict is to be detected by comparing a version number associated with the server-side data 114 to a version number associated with the client-side data 106, or by comparing a hashed version of the server-side data 114 to a hashed version of the client-side data 106, or by comparing a date at which the client-side data was last updated to a date at which the server-side data 114 was last updated. Each of the interchangeable plugins 124a-c may additionally or alternatively specify whether conflicts are to be detected by the server 108 or by the client-side application 104 (e.g., the client devices 102). Further, each of the interchangeable plugins 124a-c may additionally or alternatively specify how to resolve a detected conflict. For example, an interchangeable plugin 124a may specify that a conflict is to be resolved by prioritizing the server-side data 114 over the client-side data 106, or by prioritizing the client-side data 106 over the server-side data 114. The software developer 128 can then select the best interchangeable plugin 124b for the system 100 and easily incorporate that interchangeable plugin 124b into the API 110, for example, by downloading the interchangeable plugin 124b onto the server 108 and integrating the interchangeable plugin 124b into the API 110.

In some examples, the software developer 128 can additionally or alternatively obtain an application module 126b and integrate the application module 126b into the client-side application 104 to facilitate detection of conflicts between the server-side data 114 and the client-side data 106. For example, the software developer 128 can access a list of preprogrammed application modules 126a-c that implement different conflict-detection strategies. The list may be derived from the repository 122, which may have any number and combination of application modules 126a-c written in any number and combination of programming languages, with each of the application modules 126a-c being configured for implementing a conflict-detection strategy that is different from the other application modules 126a-c. The repository 122 may have dozens or hundreds of open-source application modules created by numerous entities, along with descriptions of each of the application modules.

Each of the application modules 126a-c may specify how to detect a conflict between the server-side data 114 and the client-side data 106. For example, an application module 126a may specify that a conflict is to be detected by comparing a version number associated with the server-side data 114 to a version number associated with the client-side data 106, or by comparing a hashed version of the server-side data 114 to a hashed version of the client-side data 106, or by comparing a date at which the client-side data was last updated to a date at which the server-side data 114 was last updated. Each of the application modules 126a-c may additionally or alternatively specify whether conflicts are to be detected by the server 108 or by the client-side application 104. Further, each of the application modules 126a-c may additionally or alternatively specify how to resolve a detected conflict. For example, an application module 126a may specify that a conflict is to be resolved by prioritizing the server-side data 114 over the client-side data 106, or by prioritizing the client-side data 106 over the server-side data 114. The software developer 128 can then select the best application module 126b for the system 100 and easily incorporate that application module 126b into the client-side application 104, for example, by downloading the application module 126b onto the developer device 116 and integrating the application module 126b into the source code 118 of the client-side application 104. The developer device 116 can then compile the source code 118 to produce an executable version of the client-side application 104 for implementation on the client device(s) 102.

The interchangeable plugins 124a-c and the application modules 126a-c may work independently or in pairs to detect conflicts. For instance, some examples may employ just an interchangeable plugin on the server 108 or just an application module in the client-side application 104 to detect conflicts between the server-side data 114 and the client-side data 106. And other examples may employ both an interchangeable plugin and an application module working in tandem to detect such conflicts. In such cases, each of the interchangeable plugins 124a-c may have a corresponding application module 126a-c designed to work in tandem with the interchangeable plugin to facilitate conflict detection.

The interchangeable plugins 124a-c and the application modules 126a-c can be designed to work "out of the box," such that they require little or no customization by the software developer 128. For example, each of the interchangeable plugins 124a-c may be specifically tailored for a particular system architecture, so that the software developer 128 need only select the right one for his system 100. And in some examples, the interchangeable plugins 124a-c and application modules 126a-c are further customizable using functions (e.g., routines) and objects that are abstracted from the underlying specifics of the system 100, so that the interchangeable plugins 124a-c and application modules 126a-c can be easily used by less sophisticated users. For example, an interchangeable plugin 124a can include a series of interrelated functions that accept input parameters, where the user only needs to set the appropriate values for a limited subset of the input parameters to use the interchangeable plugins 124a-c. This can enable users that have little or no understanding of the low-level details of the system 100 to use the interchangeable plugins 124a-c.

After integrating an interchangeable plugin 124a-c into the API 110 and/or an application module 126a-c into a client-side application 104, the server 108 and the client-side application 104 can cooperate with one another to implement the conflict-detection strategy selected by the software developer 128. One example of such a process is shown in FIG. 2 described below.

Figure 2:
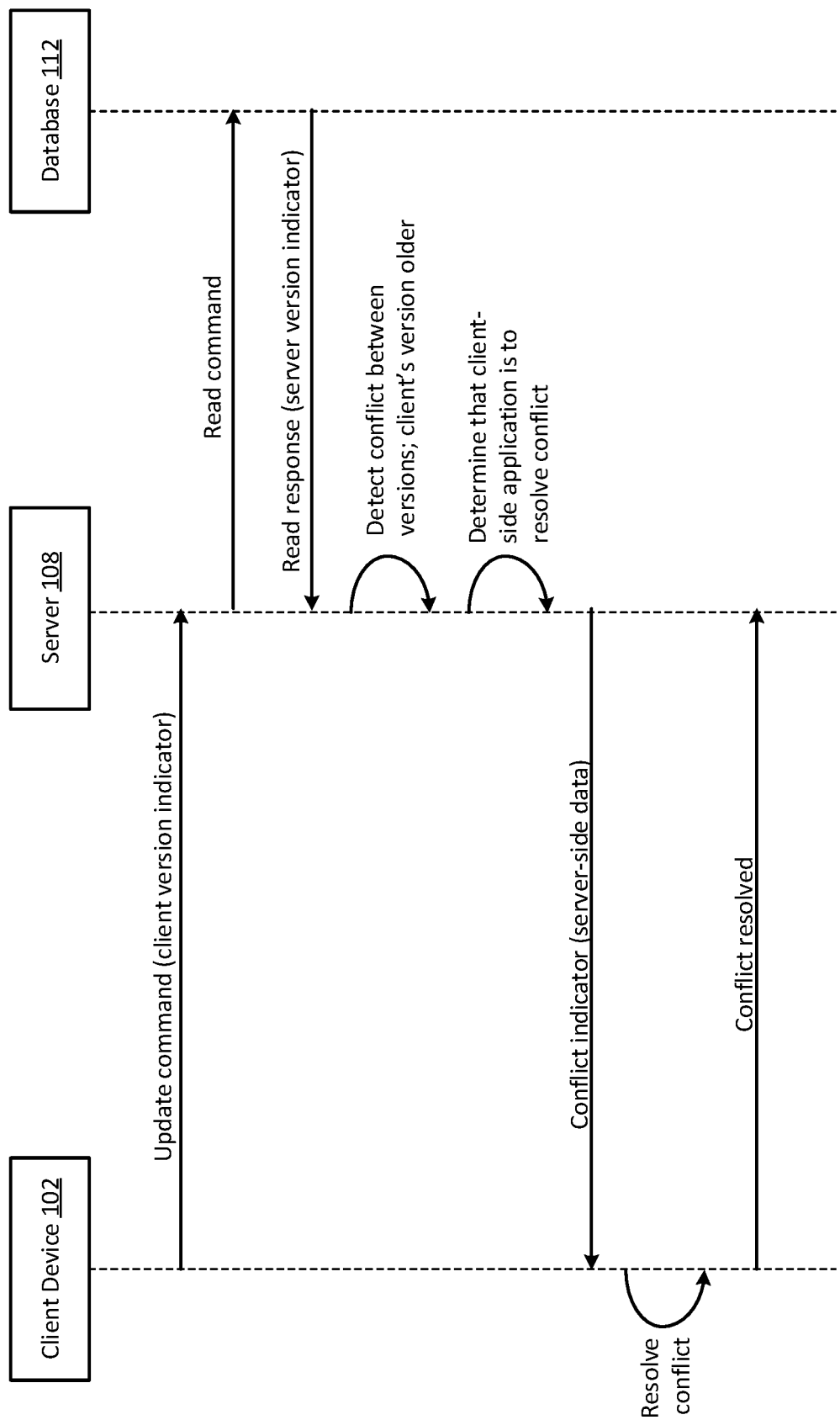
FIG. 2 is a sequence diagram of an example of a process for detecting conflicts between server-side data and client-side data according to some aspects.

FIG. 2 is a sequence diagram of an example of a process for employing interchangeable plugins for detecting conflicts between server-side data and client-side data according to some aspects. Other examples can include more steps, fewer steps, different steps, or a different combination of steps than are shown in FIG. 2. While various steps are described below as being implemented by the client device 102, it should be understood that the client device 102 is executing an application module in a client-side application to implement at least some of these steps. Likewise, while various steps are described below as being implemented by the server 108, it should be understood that the server 108 is executing an interchangeable plugin in an API to implement at least some of these steps.

As shown, the process begins with the client device 102 transmitting an update command to the server 108. The update command is configured to cause the server 108 to update certain data. Both the client device 102 and the server 108 should have the same version of the data—i.e., the client-side version of the data should be the same as the server-side version of the data. To help prevent conflicts, the update command also includes a client version indicator, which indicates the version of the data that is currently stored on the client device 102 (the "client's version").

The server 108 can receive the update command and responsively determine the version of the data that is currently stored in the database 112 (the "server's version"). For example, the server 108 can issue a read command to the database 112 for a server version indicator, which indicates the version of the data that is currently stored in the database 112. Having determined the client's version and the server's version, the server 108 can then execute an interchangeable plugin to detect a conflict between the two versions. For example, the server 108 can detect that the server's version is newer than the client's version (e.g., based on the server version indicator having a higher numerical value than the client version indicator), and thus that the client's version is outdated.

After detecting the conflict, the server 108 can execute the interchangeable plugin to determine whether the server 108 is to resolve the conflict or the client device 102 is to resolve the conflict. In this example, the interchangeable plugin specifies that the client device 102 (e.g., the client-side application) is to resolve the conflict. So, the server 108 transmits a conflict indicator to the client device 102, where the conflict indicator indicates that a conflict occurred. The conflict indicator may include the server's version of the data in some examples.

The client device 102 can receive the conflict indicator and responsively resolve the conflict. For example, the client device 102 can execute the application module that is part of its client-side application to resolve the conflict. In one such example, the client device 102 can overwrite its version of the data with the server's version of the data, thereby synchronizing the two. The client device 102 can then transmit a communication back to the server 108 indicating that the conflict has been resolved (e.g., as shown in FIG. 2). Alternatively, the client device 102 can determine that its version of the data is to have priority over the server's version, despite the server's version being newer. So, the client device 102 can transmit a communication back to the server 108 configured to cause the server 108 to overwrite its version of the data with the client's version. Either way, the conflict is resolved at the end of the process.

The process described above is just one possible example of conflict detection and resolution, and numerous modifications and variations are contemplated within the scope of this disclosure. For instance, an alternative example may involve the client device 102 detecting the conflict, server 108 resolving the conflict, or both of these.

Figure 3:
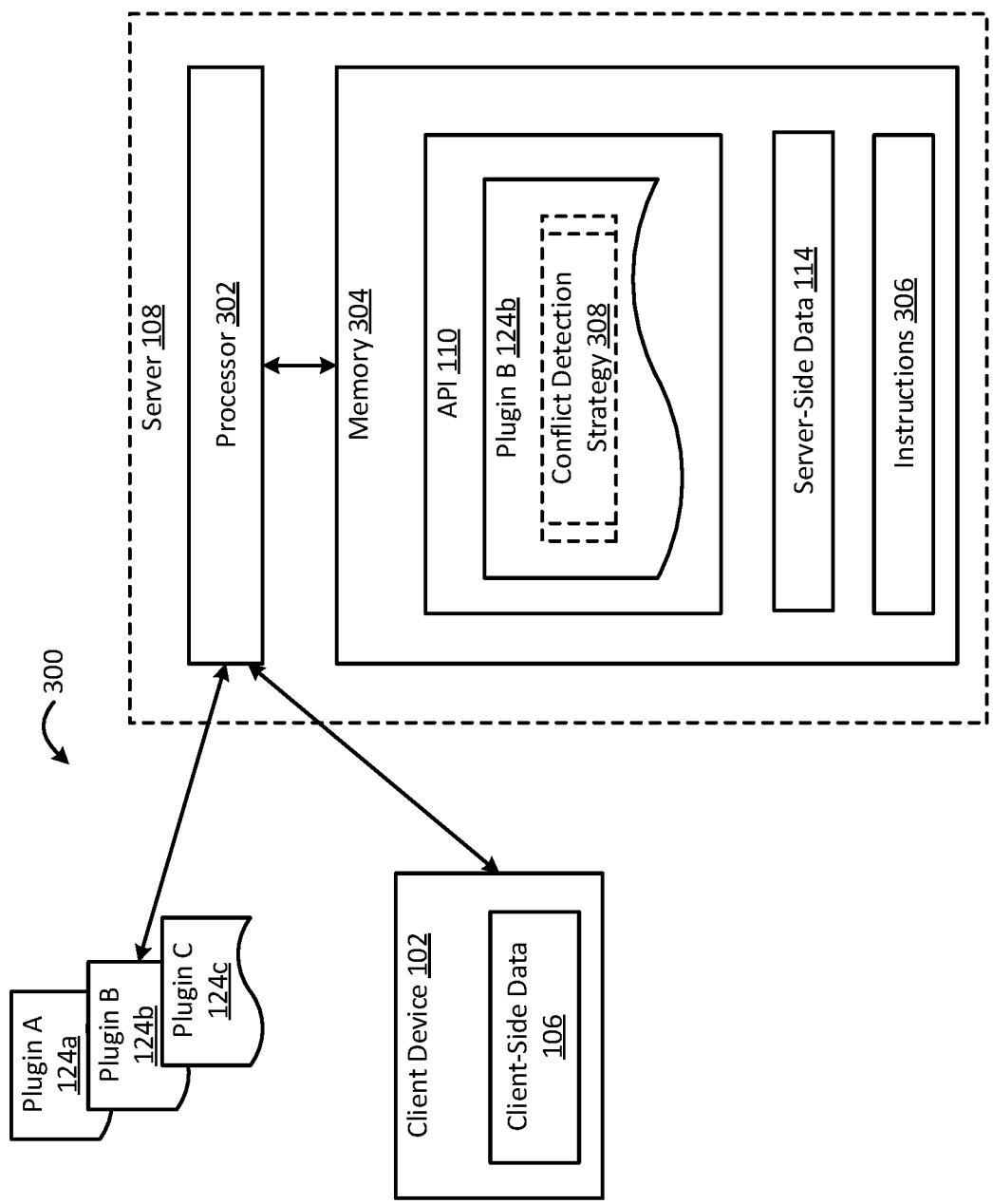
FIG. 3 is a block diagram of another example of a system including interchangeable plugins for detecting conflicts between server-side data and client-side data according to some aspects.

FIG. 3 is a block diagram of another example of a system 300 including interchangeable plugins 124a-c for detecting conflicts between server-side data 114 and client-side data 106 according to some aspects. The system 300 includes a processor 302 communicatively coupled with a memory 304. The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. In some examples, at least some of the memory can include a medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can receive an interchangeable plugin 124b from among a plurality of interchangeable plugins 124a-c for performing conflict detection between server-side data 114 and client-side data 106. The server-side data 114 is handled by (e.g., controlled by) a server 108, which may or may not include the processor 302 and/or the memory 304. The client-side data 106 is handled by a client device 102. Each interchangeable plugin 124a-c can implementing a particular conflict-detection strategy that is different than the other interchangeable plugins. And each interchangeable plugin 124a-c can be selectively integrated into an API 110 through which the client device 102 is to communicate with the server 108.

After receiving the interchangeable plugin 124b, the processor 302 can integrate the received interchangeable plugin 124b into the API 110, thereby enabling the API 110 to implement the particular conflict-detection strategy 308 defined by the interchangeable plugin 124b. The processor 202 can then detect a conflict between the server-side data 114 and the client-side data 106 in accordance with the particular conflict-detection strategy 308 defined by the interchangeable plugin 124b.

Figure 4:
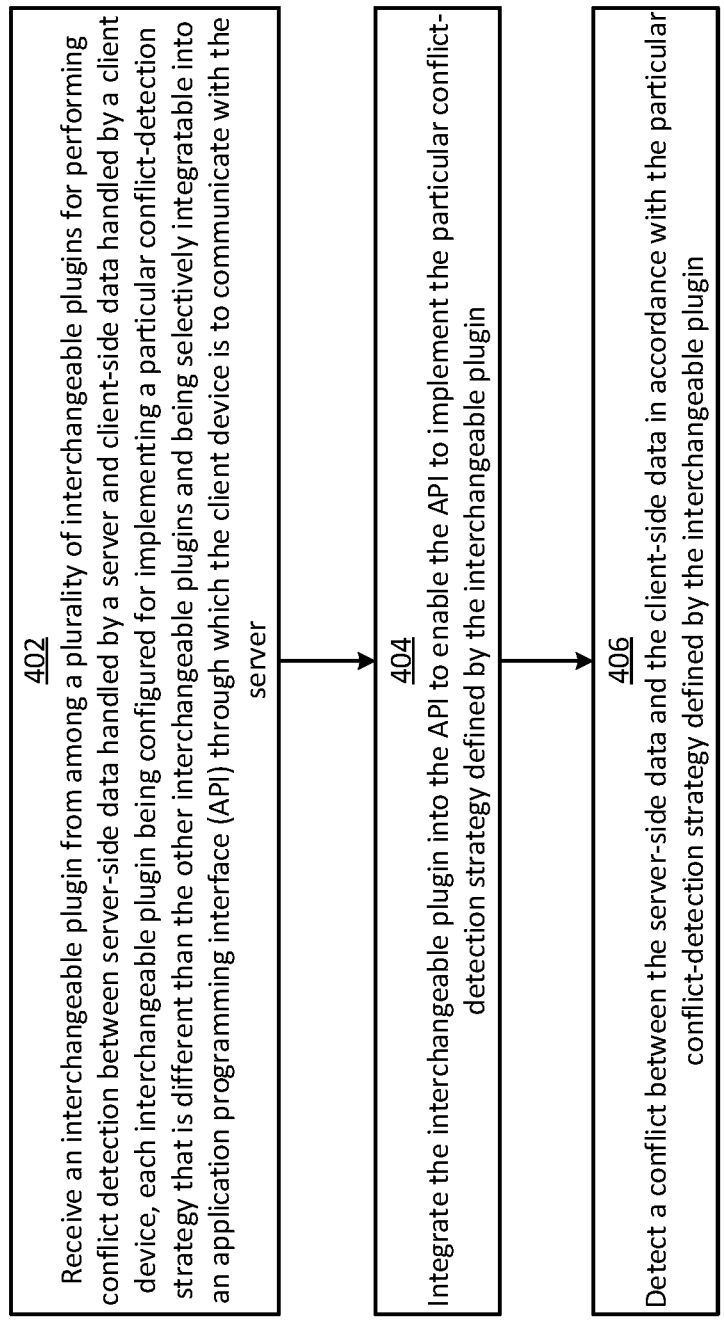
FIG. 4 is a flow chart of an example of a process for employing interchangeable plugins for detecting conflicts between server-side data and client-side data according to some aspects.

FIG. 4 is a flow chart of an example of a process for employing interchangeable plugins for detecting conflicts between server-side data and client-side data according to some aspects. Other examples can include more steps, fewer steps, different steps, or a different combination of steps than are shown in FIG. 4. The steps of FIG. 4 are discussed below with reference to the components discussed above in relation to FIG. 3.

In block 402, a processor 302 receives an interchangeable plugin 124b from among a plurality of interchangeable plugins 124a-c for performing conflict detection between server-side data 114 and client-side data 106. The server-side data 114 is handled by a server 108 and the client-side data 106 is handled by a client device 102.

Each interchangeable plugin 124a-c can implementing a particular conflict-detection strategy that is different than the other interchangeable plugins. And each interchangeable plugin 124a-c can be selectively integrated into an API 110 through which the client device 102 is to communicate with the server 108.

As one particular example, the processor 302 can generate a list of the interchangeable plugins 124a-c that are available to a software developer. The processor 302 can then receive a selection of a particular interchangeable plugin 124b from the software developer via an input device, such as a keyboard, mouse, or touchscreen. Based on the selection, the processor 302 can download or otherwise obtain the selected interchangeable plugin 124b.

In block 404, the processor 302 integrates the received interchangeable plugin 124b into the API 110, which can enable the API 110 to implement the particular conflict-detection strategy 308 defined by the interchangeable plugin 124b. In some examples, the processor 302 can integrate the interchangeable plugin 124b into the API 110 by importing the interchangeable plugin 124b into the API 110. In other examples, the interchangeable plugin 124b is a code library configured to be incorporated into source code for the API 110. So, the processor 302 can integrate the code library of the interchangeable plugin 124b into the source code of the API 110. The processor 302 can employ any number and combination of approaches for integrating the interchangeable plugin 124b into the API 110.

In block 406, the processor 202 detects a conflict between the server-side data 114 and the client-side data 106 in accordance with the particular conflict-detection strategy 308 defined by the interchangeable plugin 124b. For example, the particular conflict-detection strategy 308 may include a first series of steps for detecting a conflict between the server-side data 114 and the client-side data 106. So, the processor 202 can implement the first series of steps to detect whether or not there is a conflict. The particular conflict-detection strategy 308 may also include a second series of steps for resolving the conflict between the server-side data 114 and the client-side data 106. So, the processor 202 can implement the second series of steps to resolve the conflict, in response to detecting the conflict.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
   a processor; and
   a memory including instructions that are executable by
      the processor for causing the processor to:

receive an interchangeable plugin from among a plurality of interchangeable plugins for performing conflict detection between server-side data handled by a server and client-side data handled by a client device, wherein the client-side data and the server-side data correspond to a client-side application, each interchangeable plugin being configured for implementing a particular conflict-detection strategy that is different than the other interchangeable plugins and being selectively integratable into an application programming interface (API) of the server to facilitate operation of the client-side application, wherein the interchangeable plugin is associated with a corresponding application module configured to be integrated into the client-side application for facilitating conflict detection between the client-side data and the server-side data in accordance with the particular conflict-detect strategy of the interchangeable plugin;

integrate the interchangeable plugin into the API to enable the API to implement the particular conflict-detection strategy defined by the interchangeable plugin; and detect a conflict between the server-side data and the client-side data in accordance with the particular conflict-detection strategy defined by the interchangeable plugin.

2. The system of claim 1, wherein the particular conflict-detection strategy further specifies how to detect the conflict between the server-side data and the client-side data.

3. The system of claim 2, wherein the particular conflict-detection strategy includes a setting that further specifies whether the conflict is to be detected by the server or by the client device.

4. The system of claim 1, wherein the particular conflict-detection strategy specifies how to resolve the conflict between the server-side data and the client-side data.

5. The system of claim 1, wherein the corresponding application module includes a code library configured to be incorporated into source code of the client-side application for enabling the client-side application to cooperate with the server to effectuate the particular conflict-detection strategy.

6. The system of claim 1, wherein the client-side application is a native mobile application, the client device is a mobile device, and the server is configured to implement backend functionality for the mobile application.

7. The system of claim 1, wherein the plurality of interchangeable plugins are created by a plurality of entities.

8. The system of claim 1, wherein the particular conflict-detection strategy indicates that the conflict is to be detected by comparing hashed versions of the server-side data and the client-side data.

9. The system of claim 1, wherein the particular conflict-detection strategy indicates that the conflict is to be detected by comparing a first date associated with the server-side data with a second date associated with the client-side data.

10. The system of claim 1, wherein the particular conflict-detection strategy indicates that the conflict is to be resolved by prioritizing the client-side data over the server-side data.

11. A method comprising:

receiving, by a processor, an interchangeable plugin from among a plurality of interchangeable plugins for performing conflict detection between server-side data handled by a server and client-side data handled by a client device, wherein the client-side data and the server-side data correspond to a client-side application, each interchangeable plugin being configured for implementing a particular conflict-detection strategy that is different than the other interchangeable plugins and being selectively integratable into an application programming interface (API) of the server to facilitate operation of the client-side application, wherein the interchangeable plugin is associated with a corresponding application module configured to be integrated into the client-side application for facilitating conflict detection between the client-side data and the server-side data in accordance with the particular conflict-detect strategy of the interchangeable plugin;

integrating, by the processor, the interchangeable plugin into the API to enable the API to implement the particular conflict-detection strategy defined by the interchangeable plugin; and detecting, by the processor, a conflict between the server-side data and the client-side data in accordance with the particular conflict-detection strategy defined by the interchangeable plugin.

12. The method of claim 11, wherein the particular conflict-detection strategy further specifies how to detect the conflict between the server-side data and the client-side data.

13. The method of claim 12, wherein the particular conflict-detection strategy includes a setting that further specifies whether the conflict is to be detected by the server or by the client device.

14. The method of claim 13, wherein the particular conflict-detection strategy specifies how to resolve the conflict between the server-side data and the client-side data.

15. The method of claim 11, wherein the corresponding application module includes a code library configured to be incorporated into source code of the client-side application for enabling the client-side application to cooperate with the server and thereby effectuate the particular conflict-detection strategy.

16. The method of claim 11, wherein the client-side application is a mobile application, the client device is a mobile device, and the server is configured to implement functionality supporting the mobile application.

17. The method of claim 11, wherein the plurality of interchangeable plugins are created by a plurality of entities.

18. A non-transitory computer-readable medium comprising program code that is executable by a processor for causing the processor to:

receive an interchangeable plugin from among a plurality of interchangeable plugins for performing conflict detection between server-side data handled by a server and client-side data handled by a client device, wherein the client-side data and the server-side data correspond to a client-side application, each interchangeable plugin being configured for implementing a particular conflict-detection strategy that is different than the other interchangeable plugins and being selectively integratable into an application programming interface (API) of the server to facilitate operation of the client-side application, wherein the interchangeable plugin is associated with a corresponding application module configured to be integrated into the client-side application for facilitating conflict detection between the client-side data and the server-side data in accordance with the particular conflict-detect strategy of the interchangeable plugin;

integrate the interchangeable plugin into the API to enable the API to implement the particular conflict-detection strategy defined by the interchangeable plugin; and detect a conflict between the server-side data and the client-side data in accordance with the particular conflict-detection strategy defined by the interchangeable plugin.

19. The non-transitory computer-readable medium of claim 18, wherein the particular conflict-detection strategy further specifies whether the conflict is to be detected by the server or by the client device.

20. The non-transitory computer-readable medium of claim 18, wherein the corresponding application module includes a code library configured to be incorporated into source code of the client-side application for enabling the client-side application to cooperate with the server and thereby effectuate the particular conflict-detection strategy.

* * * * *